Jan. 3, 1933.  E. J. KEARNEY ET AL  1,892,894
MACHINE TOOL
Filed Nov. 8, 1928   8 Sheets-Sheet 1

INVENTORS
Edward J. Kearney
Joseph B. Armitage
BY
Fred G. Parsons
ATTORNEY

Jan. 3, 1933.  E. J. KEARNEY ET AL  1,892,894

MACHINE TOOL

Filed Nov. 8, 1928    8 Sheets-Sheet 5

Jan. 3, 1933.  E. J. KEARNEY ET AL  1,892,894
MACHINE TOOL
Filed Nov. 8, 1928   8 Sheets-Sheet 8

Patented Jan. 3, 1933

1,892,894

UNITED STATES PATENT OFFICE

EDWARD J. KEARNEY AND JOSEPH B. ARMITAGE, OF WAUWATOSA, WISCONSIN, ASSIGNORS TO KEARNEY & TRECKER CORPORATION, OF WEST ALLIS, WISCONSIN, A CORPORATION OF WISCONSIN

MACHINE TOOL

Application filed November 8, 1928. Serial No. 317,922.

This invention relates to machine tools and particularly to transmission and control mechanism therefor.

It is an object of this invention to improve a spindle and feed transmission for milling machines, and to provide hand and automatic control therefor, of improved mechanism and result.

Another object is to provide a spindle and feed transmission adapted for predetermined synchronized control, and control mechanism therefor.

Other objects relate to control mechanism for timing various forward and reverse movements of a support, and the rate thereof, whereby the support may traverse any portion of its path at either a feed or quick traverse rate, and to control the starting and stopping of the support and the starting and stopping of the machine spindle, all in a variable sequence predetermined according to the setting of the control mechanism; and to provide transmission mechanism for the support and spindle which is particularly adapted for such control.

Another object is generally to simplify and to improve the construction and operation of machine tools, including the transmission and control mechanism and the combination thereof, and still other objects will be apparent from the specification.

The invention consists in the construction, arrangement and combination of parts as herein illustrated, described and claimed and in such modifications of the structure illustrated as may be equivalent to the structure claimed.

In the drawings the same reference characters have been applied to the same parts in each of the various views, of which.

Figure 1:
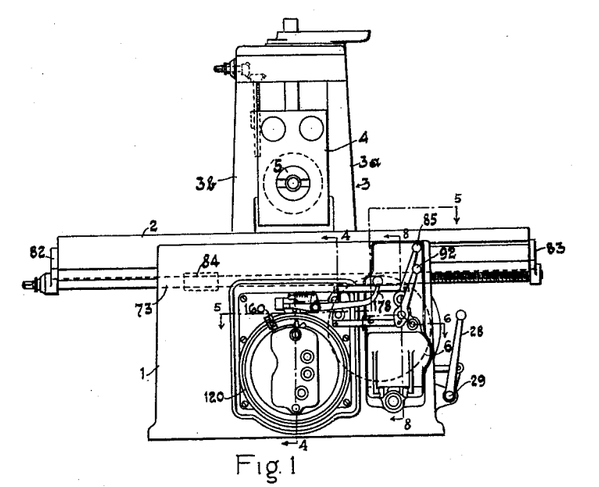
Fig. 1 is a front elevation of a milling machine embodying the invention.
Figure 2:
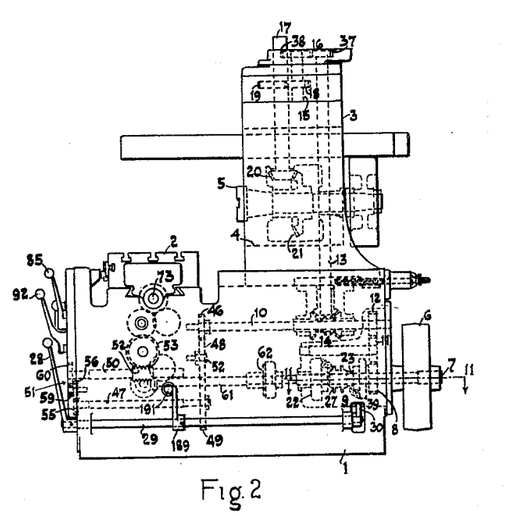
Fig. 2 shows an elevation of the same machine viewed from the right in Fig. 1.

The machine structure provides a stationary bed or support 1, upon which is slidably guided a table or support 2 for movement to right or left in Fig. 1, and also a head or support 3 for movement to right or left in Fig. 2, and transverse to the table movement. Head 3 includes portions 3a—3b, Fig. 1, spaced apart for guiding a vertically movable spindle carrier or support 4, in which a spindle 5 is journaled. The various supports provide relative movement between table 2 and spindle 5 in three mutually transverse paths, while maintaining table 2 at a fixed height. Since the various slides and guides may be of any suitable form and since the details thereof form no part of this invention, they will not be described.

A spindle transmission train is provided as follows: A drive pulley 6 fixed on shaft 7 may drive gear 8 through a clutch generally denoted by the numeral 9, Figs. 2–11. Gear 8 drives a shaft 10 through an idler 11 and a gear 12 fixed on the shaft. Shaft 10 drives a vertical shaft 13 through a reverser generally denoted by the numeral 14. A shaft 15 journaled in head 3 is driven from shaft 13 through a rate changer generally denoted by the numeral 16 and drives a shaft 17 journaled for vertical movement with carrier 4, through a pair of gears 18—19, gear 19 being splined with shaft 17 to permit vertical movement of the shaft. Shaft 17 drives spindle 5 through bevel gears 20 and 21.

Figures 11, 12:
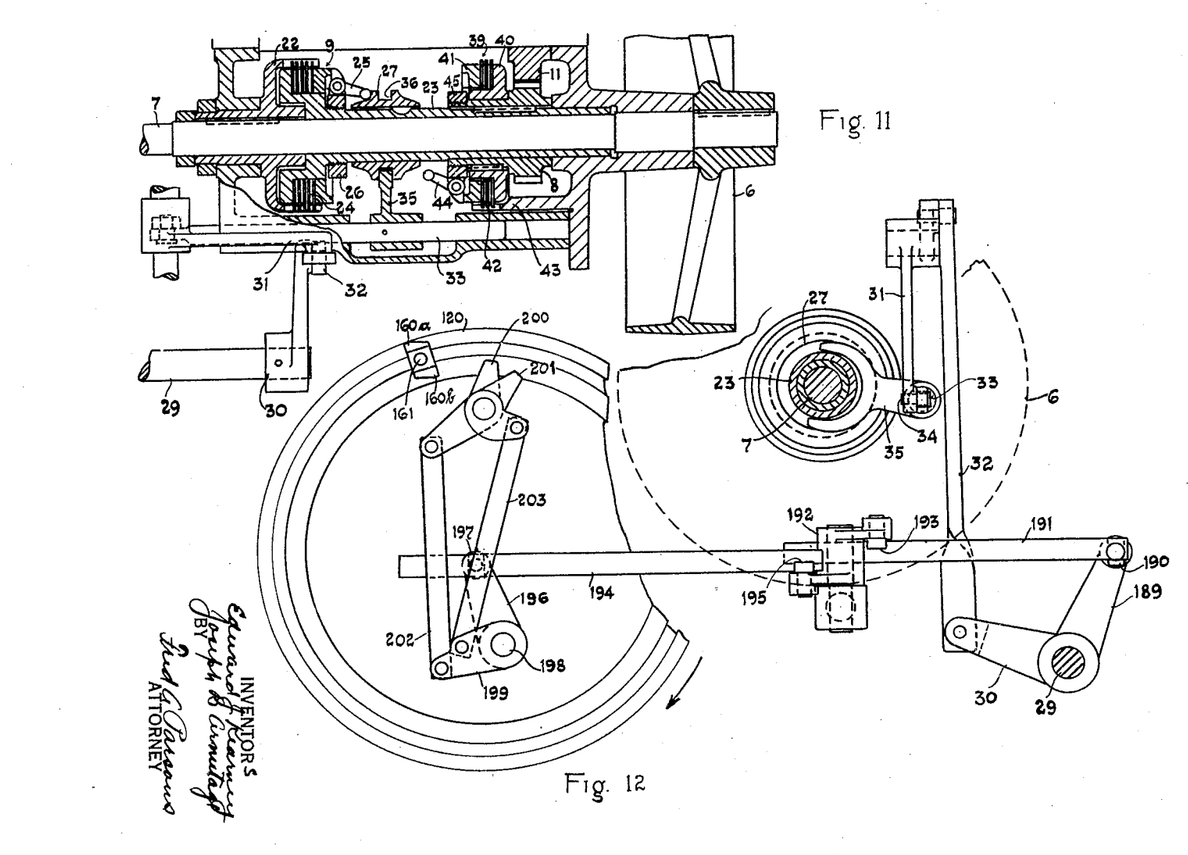
Fig. 11 is a horizontal section along line 11—11 of Fig. 2 and enlarged, also a partial top view of operating members connecting with the mechanism represented in section.
Fig. 12 is a development or diagram of clutch and brake shifting mechanism incorporated in the machine.

The clutch 9 may be of any suitable form, but as here shown, includes a driving member 22, Fig. 11, fixed on shaft 7, a driven member 23 fixed with gear 8, and a series of friction discs 24 having alternate discs slidably keyed with the driving and driven members respectively. Discs 24 may be forced into mutual driving contact by the means of a lever 25 pivoted on an adjustable nut member 26 for the one end of the lever to contact an end disc of the series when the lever 25 is moved by the means of a suitably formed spool 27 slidably mounted on the hub of member 23. A hand lever 28, Figs. 1–2, may operate spool 27 through mechanism including a shaft 29, on which lever 28 is fixed, a lever 30 fixed on shaft 29, Figs. 11–12, a crank 31 connected with lever 30 by the means of a pivoted rod 32, a sliding rod 33 connected with crank 31 by the means of a pin 34 working in an elongated slot, and a fork 35 fixed on rod 33 and engaging an annular groove 36 in spool 27.

The rate changer 16 may be of any suitable form, but here consists of a pair of gears 37 and 38, Fig. 2, of different diameter, which may be manually reversed in their position on shafts 13—15, and thus provide a choice of two speeds for the spindle.

The spindle train is also provided with a brake generally denoted by the numeral 39, Figs. 2–11. Gear 8 has fixed on the extended hub thereof an abutment member 40 and slidably keyed thereon is a pressure member 41. Intermediate between members 40 and 41 is a series of friction discs 42, the alternate discs being slidably keyed with the members 40 and with a member 43 fixed with the machine base 1. A lever 44 is pivoted at a point intermediate the arms thereof with an adjustable threaded collar 45, one arm of the lever 44 being contacted when spool 27 is suitably moved by mechanism as previously described and forcing the other arm to contact member 41 in a direction to force the friction discs into contact and against abutment 40. Since alternate discs are keyed with a stationary member, this results in bringing the entire spindle train and any trains connected therewith quickly to a stop. The spool 27 is out of the engaged position for clutch 9 before the brake 39 is operative, there being an intermediate spool position in which neither the clutch nor the brake operate.

A table feed train is driven from the spindle train at a point controlled by clutch 9 and brake 39, but unaffected by the rate changer 16. On the extended shaft 10, Fig. 2, is fixed a gear 46 which drives a shaft 47 through gears 48—49. Shaft 47 drives shaft 50 through a feed rate changer generally denoted by the numeral 51, Figs. 2–8. A worm 52 fixed on shaft 50 drives a wheel 53, Figs. 8–9, upon the hub of which are teeth forming a feed clutch member 54.

Rate changer 51 may be of any suitable form, but here consists of a pair of gears 55—56 of different diameter and interchangeable in position on the end of shaft 47 and on a sleeve 57 which is rotatably supported on a stud 58. Another pair of different diameter gears 59—60 are interchangeable between sleeve 57 and the end of shaft 50. The gears of either pair may be manually reversed in driving position, whereby any of four rates of feed are available.

A table quick traverse train is driven from the pulley 6 at a point unaffected by the clutch 9 or brake 39. Shaft 7 is extended and coupled to a shaft 61, Fig. 2, through a coupling device 62 of any suitable form. Shaft 61 drives a gear 63, Figs. 8–9, through bevel gears 64—65. Gear 63 drives gear 66 through idler 67. On the extended hub of gear 66 are gear teeth forming a quick traverse clutch member 68.

Table 2 may be driven either from the feed train or from the quick traverse train, from clutch members 54 or 68 respectively, as follows: An intermediate clutch member 69 may be shifted in the one or the other direction to engage suitable end teeth thereon with the clutch teeth of the one or the other clutch members 54 or 68, there being an intermediate position of member 69 in which it is not engaged with either of the members 54—68. Fixed on member 69 is a gear 70 which, in any position of member 69, engages with a gear 71 fixed on a shiftable intermediate clutch member 72 of a table reverser through which gear 71 may drive screw 73. The table reverser is constructed as follows: Member 72 is provided at each end with clutch teeth and may be shifted in opposite directions to engage the clutch teeth on the one or the other end with complementary clutch teeth on clutch members 74 or 75 or to a central disengaged position. Fixed on member 74 is a gear 76 meshed with a gear 77 fixed on a sleeve 78. Fixed on member 75 is a gear 79 which may drive a gear 80 fixed on sleeve 78 through an idler 81.

Sleeve 78 is slidably splined with a table screw 73 which is journaled in suitable brackets 82—83, Fig. 1, fixed on table 2 but is prevented from axial movement relative to the table. Screw 73 is in threaded engagement with a nut 84 fixed in bed 1.

The arrangement described is such that accordingly as clutch member 69 is shifted either the feed or quick traverse trains are connected, and accordingly as clutch member 72 is shifted the connected train may drive the table in the one or the other direction, or if member 72 is centrally positioned the table will stop.

Figures 6, 7, 8, 9, 10:
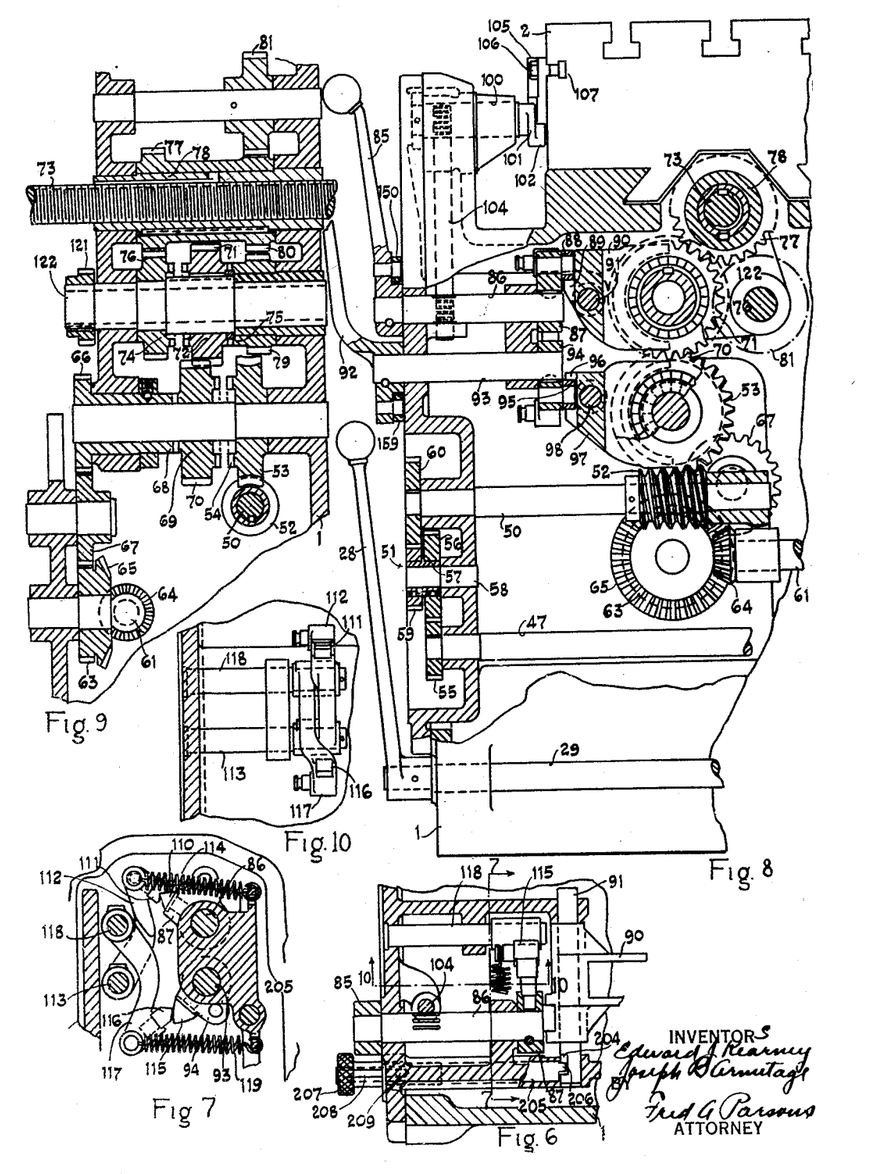
Fig. 6 shows a partial horizontal section taken along line 6—6 of Fig. 1 and enlarged.
Fig. 7 is a partial vertical section along line 7—7 of Fig. 6.
Fig. 8 shows a partial vertical section along line 8—8 of Fig. 1 and enlarged.
Fig. 9 is a developed sectional view of a gear train shown in Fig. 8.
Fig. 10 shows a partial vertical section along line 10—10 of Fig. 6.

Control means are provided for the manual shifting of clutch member 72. A lever 85, Figs. 1—2—8, is fixed on a shaft 86. A lever 87, Fig. 8, also fixed on shaft 86 has a pivoted shoe 88 engaging a suitable slot 89 in a fork 90 which slides on a rod 91 and engages the sides of gear 71, Fig. 9. By the described mechanism the movement of lever 85 in either direction about the axis of shaft 86 shifts clutch member 72 in a corresponding direction.

Control means are provided for the manual shifting of clutch member 69, consisting of a lever 92, Figs. 1—2—8, fixed on a shaft 93 upon which is also fixed a lever 94 having a pivoted shoe 95 engaging a suitable slot 96 in a fork member 97 which slides on a rod 98 and engages the sides of gear 70, Fig. 9, whereby movement of lever 92 in either direction shifts clutch member 69 in a corresponding direction.

Table operated means are provided for power shifting of clutch member 72, as follows: A pivoted control post or member 100, Figs. 3—5—8, is provided with a head portion 101, upon which are fixed lug portions 102—103, Fig. 3, respectively on opposite sides of the axis of post 100. A vertical rod 104 has rack teeth engaging at the one end with suitable gear teeth on the post 100 and at the other end with suitable gear teeth on the shaft 86, whereby movement of hand lever 85 to the right in Fig. 3 to the position there shown moves the lug 103 upwardly, and lug 102 downwardly at the same time that clutch member 72 connected therewith, as described, is engaged in a direction to move the table to the right in Fig. 3. A control dog 105, Figs. 3-8, adjustably fixed on table 2 by the means of a T bolt 106 engaging T slot 107 has an angular face portion 108 adapted during such table movement to contact the lug 103 and move it down again to a position corresponding to the disengaged position of clutch member 72, thereby causing table movement to stop at a point predetermined by the position of the adjustable dog 105. If lever 85 is swung in the opposite direction for the opposite table movement, a similar table dog 109 reacts similarly on lug 102 to stop the table at a predetermined point.

A detent mechanism is provided for clutch member 72 as follows: Fixed on member 87, Figs. 7-8, is a cam 110 engaging a cam 111 fixed on a lever 112 pivoted on a pin 113 and continuously urged toward cam 110 by a spring 114. The cam 110 is of arrow form and cam 111 has a central notch with high points on either side thereof, the central notch corresponding to the central disengaged position of member 72 and the high points to the point of clutch engagement in opposite directions respectively, except that lost motion (not shown) is provided by constructing shoe 88 somewhat smaller than slot 89, Fig. 8, in the connection between cam 110 and clutch member 72, the lost motion being of such amount that in moving toward either position of engagement the point of cam 110 passes the one or the other point of cam 111 before clutch engagement takes place, after which the cams, under the pressure of spring 114 quickly engage the clutch member, whereby there is no dwell in a position of partial engagement. During a shifting from either engaged position to a central position the same lost motion construction provides that the point of cam 110 passes the one or the other points of cam 111 before the clutch is fully disengaged, whereby the cams quickly separate the clutch teeth immediately upon clutch disengagement and prevent them from dwelling even momentarily in rubbing position.

A detent mechanism is provided for clutch member 69, as follows: Fixed on member 94, Figs. 7-8, is a cam 115 engaging a cam 116 fixed on a lever 117 pivoted on a pin 118 and continuously urged toward cam 115 by a spring 119. Each cam has an arrow point, such points coinciding in the position of the parts corresponding to the central or disengaged position of clutch member 69, except that lost motion (not shown) is provided by constructing shoe 95, Fig. 8, somewhat smaller than slot 96, the lost motion being of such amount that in movement of clutch member 69 from either position of engagement to the other, the cam points will pass one another before the clutch member disengages, and immediately after disengagement the cams will act under the pressure of spring 119 to quickly force the clutch member into the position of opposite engagement.

Figure 3:
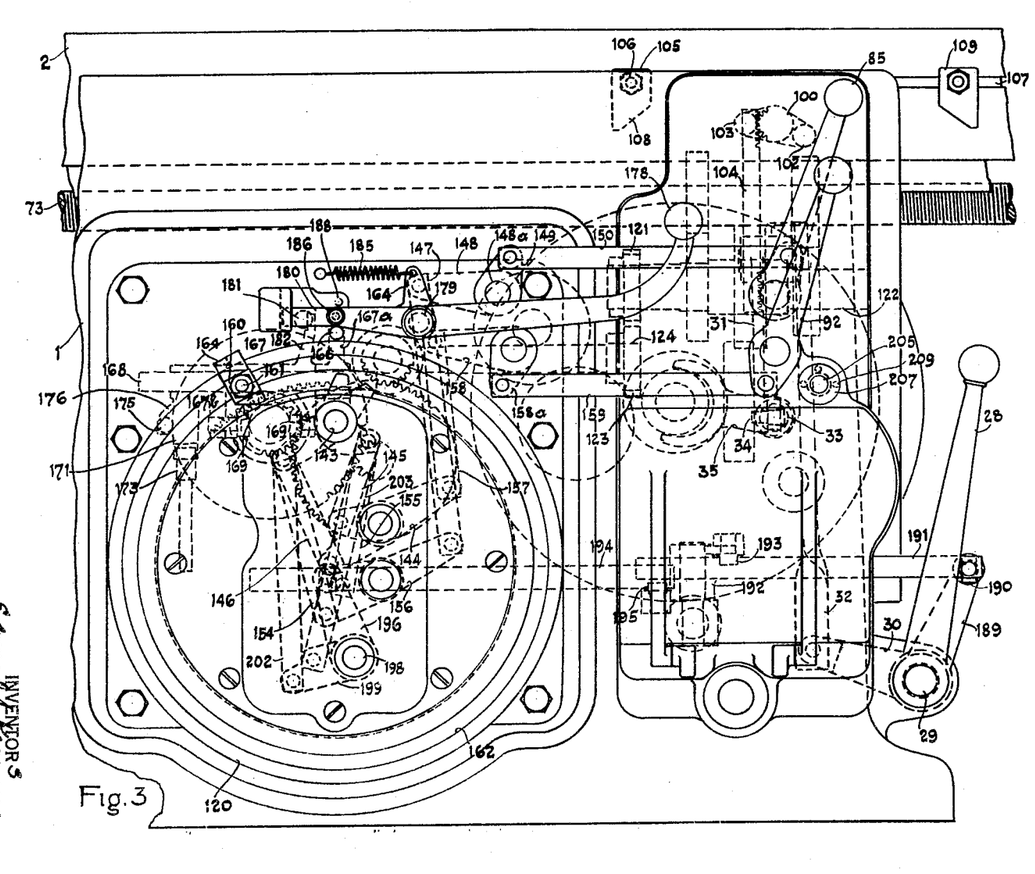
Fig. 3 is a portion of the front elevation shown in Fig. 1 and enlarged.
Figure 4:
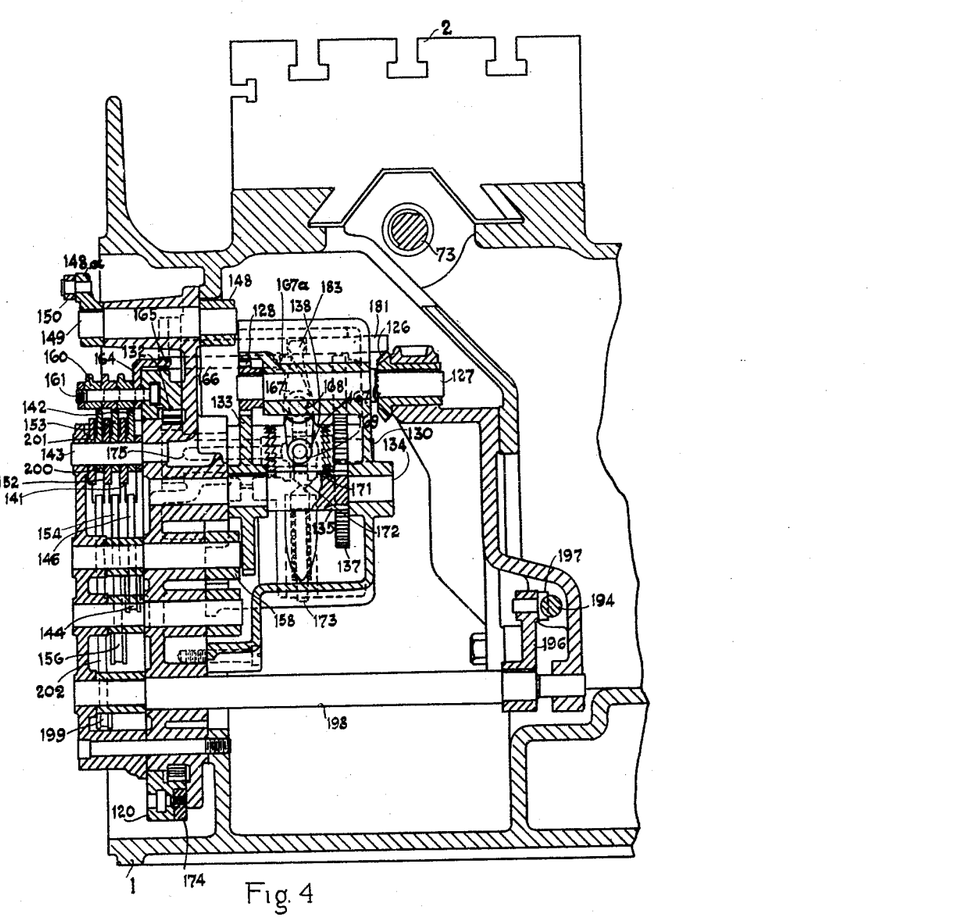
Fig. 4 is a partial vertical section taken along line 4—4 of Fig. 1 and enlarged.
Figures 13, 14, 15, 16:
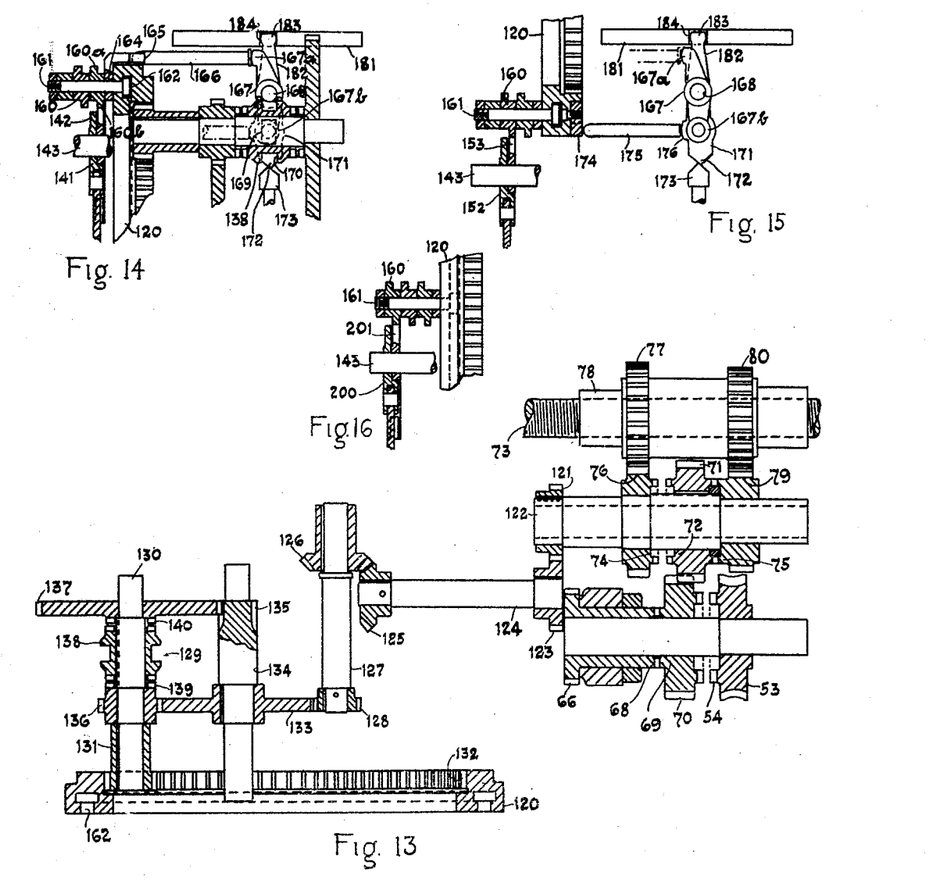
Fig. 13 is a development of one of the driving trains of the machine.
Figs. 14, 15, 16, 17, 18, 19 show portions or diagrams of shifting mechanism for various clutch members in the machine as will be explained.
Figure 17:
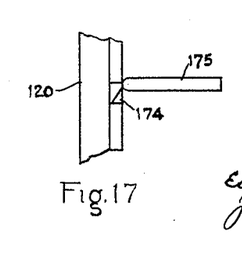
Figure 18:
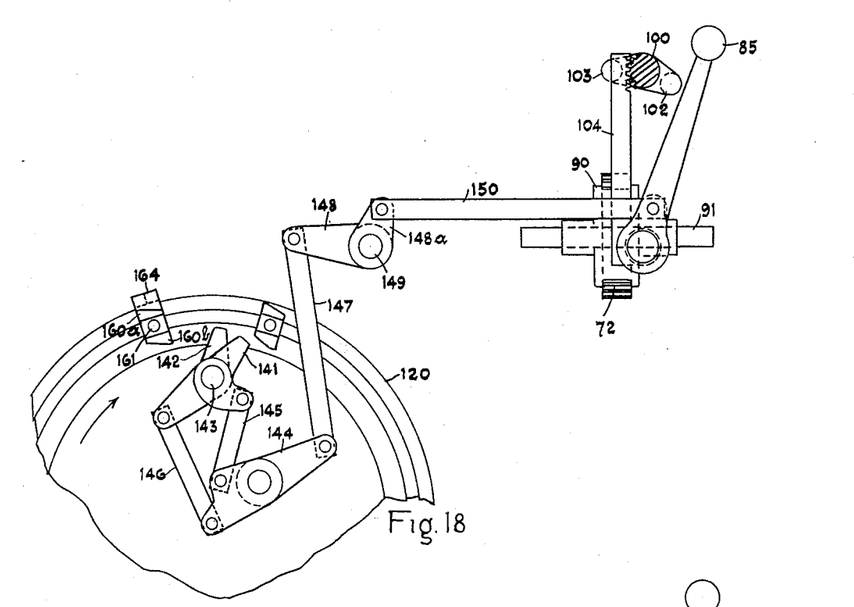
Figure 19:
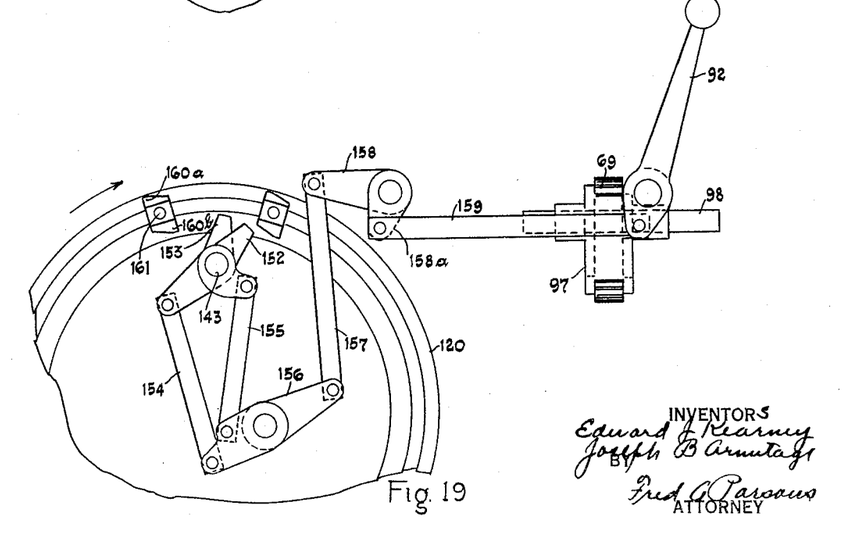

Power mechanism is provided for movement of clutch members 69 and 72 independently of the table movement, as follows: A carrier or dog support member 120, Figs. 3—4—13, is supported from bed 1 for rotation, and transmission mechanism is provided for uni-directional movement thereof, including a gear 121 fixed on shaft 122, Figs. 9–13, a gear 123 meshed therewith and fixed on a shaft 124, Figs. 3–13, bevel gears 125—126, a shaft 127, a gear 128 fixed thereon, a fast and slow mechanism driven by gear 128 and generally denoted by numeral 129, Fig. 13, a shaft 130 driven through the fast and slow mechanism, and a gear 131 fixed on shaft 130 and meshing with an internal gear 132 fixed with the carrier 120. The fast and slow mechanism 129 includes a large gear 133 driven from gear 128 and fixed on shaft 134 upon which is also fixed a pinion 135, and pinion 136 and gear 137 rotatable on shaft 130 and respectively meshed with gear 133 and pinion 135 there being a clutch member 138 slidably splined to shaft 130 and having ends toothed to engage complementary clutch teeth of the clutch members 139—140 respectively fixed with the gears 136—137.

The rates of gear pairs 133—136 and 135—137 is such as to drive shaft 130 at a relatively slow speed when clutch member 138 engages clutch member 140, and at a relatively fast speed when clutch member 138 engages clutch members 139. The described carrier transmission, being driven from shaft 122, does not partake of the reversal brought about by clutch member 72, Fig. 9, but is driven at a feed or quick traverse rate in accordance with the position of clutch member 69 and has a further change of rate in accordance with the position of clutch member 138.

Trip elements for the control of clutch members 72—69 are positioned adjacent the carrier 120 to be selectively shifted by dogs on the carrier. For shifting clutch member 72, a plurality of elements 141—142, Figs. 4—5—14—18, are pivoted on a pin or stud 143, forming levers, one end of which projects into the path of movement of suitable dogs adjustably positioned on carrier 120 for the one or the other to be shifted according to which one is dog contacted. The other end of each lever is connected to a lever 144 by the means of pivoted rods 145—146 respectively, the connection being such that although either lever 141—142, when contacted moves in the same direction, the lever 144 moves in the one or the other direction according to which lever 141—142 is contacted. Lever 144 is connected by the means of a pivoted rod 147 to a lever 148 fixed on a shaft 149 upon which is also fixed a lever 148a, and lever 148a is connected by means of pivoted rod 150 to the clutch lever 85, Figs. 3—8—18, which is connected to clutch member 72, as previously described.

Clutch member 69 may similarly be shifted from carrier 120. A plurality of elements 152—153, Figs. 4—5—15—19, are pivoted on pin 143 forming levers to be contacted by dogs on the carrier 120 and connected by the means of rods 154—155 for opposite movement of a pivoted lever 156 which is connected by a pivoted rod 157 with a pivoted lever 158 fixed on a shaft upon which is also fixed a lever 158a, lever 158a being connected with clutch lever 92 by the means of a rod 159, Figs. 3—8—15—19, and clutch lever 92 being connected with clutch member 69 as previously described.

Dogs, such as 160 for shifting the elements 141—142—152—153, Figs. 3—4—14—15, are constructed to be arranged on T bolts such as 161. A given dog 160 is of a width as great as the pair of levers 141—142 or 152—153 together and provides oppositely extended portions 160a—160b only one at a time of which may extend in a direction to contact a lever of a given pair. Such portions are offset, as shown in Fig. 14, whereby the different portions are individual to the different levers. The T bolts 161 are adjustable on carrier 120 in a T slot 162, Figs. 13—14, which extends around the entire face of the carrier in a position such that the dog portion extending toward the carrier axis will contact a lever during the carrier revolution, and accordingly as the one or the other dog portion is so positioned the one or the other lever of either pair may be moved by the dog whereby to move the clutch members connected with the levers in the one or the other direction. Such shifting of one or both of the clutches may be caused to take place at any time in the revolution of carrier 120, according to the position of the T bolt 161 in slot 162, the dogs used and their position on the T bolt determining the clutch to be shifted and the direction of shifting. The clutch shifting may be repeated as many times as desired during a carrier revolution by use of additional T bolts and dogs.

From the foregoing it will be seen that the table reverser clutch member 72 may be shifted by a table dog to stop the table at any point in either direction of movement. The table, once stopped, cannot be started again by the means of a table dog because the motion of the dog ceases as soon as clutch member 72 is disengaged but it may be started again in either direction by the means of a carrier dog since the carrier is unaffected by clutch member 72 and continues to move except as tripped by means later described.

The transmission mechanism for carrier 120 is of a ratio relative to the described table transmission, such that, when clutch member 138, Fig. 13, etc., is engaged with the slow speed clutch 140 table 2 may move through the distance of its greatest travel for the machine and return to its starting point somewhat before the carrier has completed one revolution. A cycle of machine operation requires that both the table cycle (consisting of a complete forward and back movement) and a carrier cycle (consisting ordinarily of one carrier revolution) should be completed before either starts a second cycle. To avoid delay caused by the table completing its cycle before the carrier and especially when the table movement is short and the delay might be relatively great, the carrier is speeded up after it has completed the clutch shifting required for a given machine cycle whereby to complete the carrier cycle very shortly after the table cycle is completed, thus reducing lost time to a minimum. This is done by shifting the clutch member 138 to engage with the fast clutch member 139 by the means of a dog 164, Figs. 4—14, on the carrier. Such dog ordinarily may act simultaneously with another carrier dog, and hence may be fixed in its position by the means of a bolt 161 also used for other dogs, and is so shown, although dog 164 may obviously be independently positioned.

In any case, an extended portion 165 of the dog, which is suitably beveled, in the course of carrier movement strikes the end of a plunger 166, Figs. 3—4—14, forcing the plunger to the right in Fig. 4. The end of the plunger bears against an arm 167a of a lever 167 pivoted on a pin 168, which also has arms 167b carrying pivoted shoes 169 engaging with an annular groove 170 in the clutch member 138 whereby clutch member 138 is forced to the left in Fig. 4, out of engagement with slow clutch member 140. Another arm 171 of lever 167 has a cam point 172 cooperating with a spring pressed plunger 173, there being lost motion (not shown) between the shoe 169 and groove 170 sufficient that the cam point 172 passes the point of plunger 173 before clutch member 138 disengages from the clutch members 140 or 139 in either direction of its movement. Thus the cam point 172 and plunger 173 act immediately after the clutch member 138 disengages to oppositely engage the clutch member 138 with fast speed clutch member 139.

The carrier being thus speeded up quickly completes its cycle of movement and the table having meanwhile also completed its cycle, the machine cycle is complete. At this point it may be desirable either to stop the carrier movement until such time as the operator desires to re-establish it, or to permit the carrier to immediately start another cycle.

The mechanism whereby the carrier may be stopped or permitted to continue to rotate at the end of its cycle is as follows: It is preferred, at the end of the carrier cycle, to shift the clutch 138 back to engagement with the slow speed clutch 140 and for this purpose a carrier dog 174, Figs. 4—15—17, is utilized. Dog 174 is positioned relative to a plunger 175, Figs. 3—4—15—17 to strike the plunger and shift it to the right in Fig. 4. Plunger 175 moves against a portion 176 of the arm 171 of lever 167, whereby the lever is shifted oppositely from the movement from plunger 166 previously described, since the plungers are on opposite sides of the pivot pin 168, and in the direction to engage clutch member 138 with the slow speed clutch member 140. The lost motion between the shoe 169 and the annular groove of clutch member 138, is, as previously mentioned, sufficient to cause cam point 172 to pass the point of plunger 173 before the clutch member 138 disengages from clutch member 139, and unless prevented, the opposite clutch engagement takes place immediately, whereby the new carrier cycle is started. If, however, it is desired to stop the carrier, an interference or interlock is provided for such purpose. Such interlock consists of a hand lever 178, Figs. 1—3—5, pivoted on stud 179 and having an end portion or arm 180 movable into and out of position to be contacted by a rod 181, Figs. 3—5—14—15 when the rod is shifted to the left in Fig. 14. The rod 181 is connected to move with lever 167 by the means of an arm 182 having an end portion 183 engaging a slot 184 in the rod. The direction of rod movement is such as to move the rod towards the end 180 of lever 178 when clutch member 138 moves to engage slow clutch member 140, and the arrangement is such that when lever 178 occupies the position shown in Fig. 3 the rod contacts the lever just after the cam point 172 passes the plunger point 173 but before the clutch member 140 is engaged, whereby the carrier stops. The lever 178 is yieldingly retained in the position shown in Fig. 3 by the means of spring 185, but at any time may be manually shifted against the resistance of the spring to swing the lever portion 180 out of the zone of interference with rod 181, at which the clutch member 138 will immediately engage slow speed clutch member 140 to start a new cycle of the carrier, and lever portion 180, upon release of lever 178 will be urged to again take up a position to stop the carrier at the end of the next cycle, which it will do as soon as rod 181 moves in the reverse direction during the shift of clutch member 138 to engage the fast clutch member 139 during the last portion of the carrier cycle as previously described.

Figure 5:
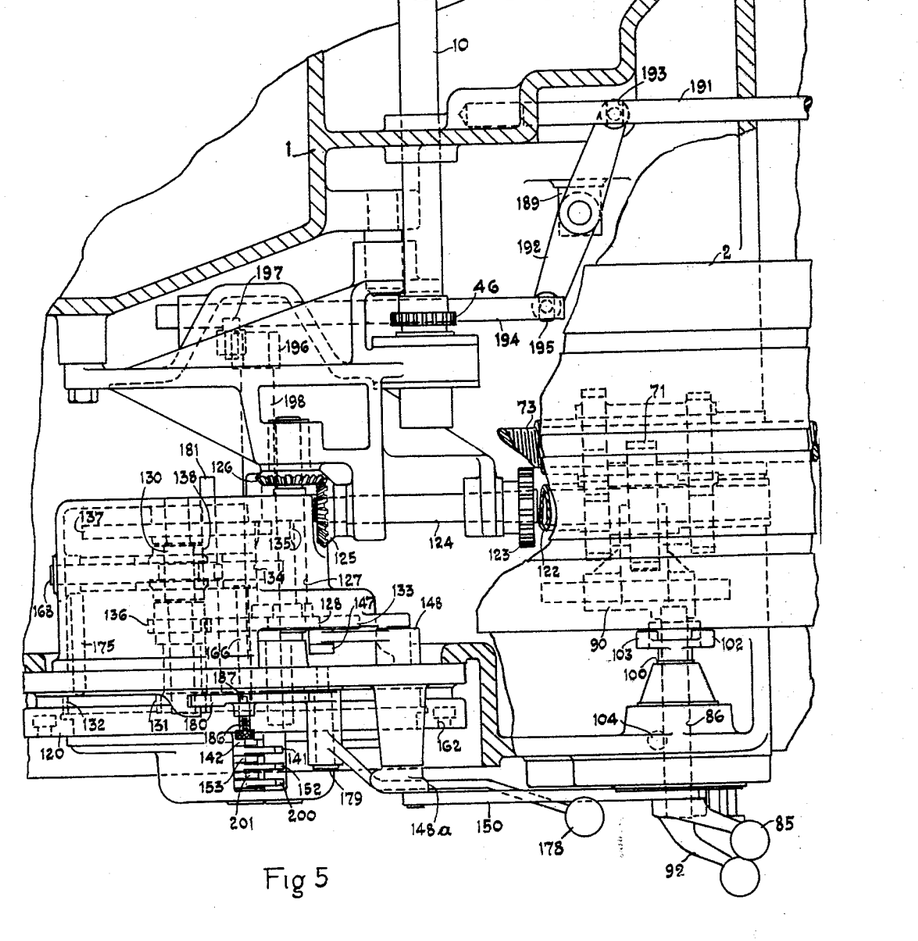
Fig. 5 is an enlarged partial top view of the machine shown in Fig. 1, partly in horizontal section along line 5—5 of Fig. 1.

Lever portion 180 may be restrained outside of the zone of interference with plunger 181 by the means of a screw 186, Figs. 3–5, threaded in the lever, the screw having a pilot point 187 adapted to enter a bore 188 when the lever is in a noninterfering position. In such case, when clutch member 138 is shifted toward slow speed clutch member 140 at the completion of the carrier cycle the shift will invariably be completed to engage the clutch and the carrier will start a new cycle immediately.

Whether the carrier is stopped at the end of its cycle or permitted to immediately repeat its cycle is a matter of operating choice. In either event it is preferable that before the carrier shall have completed its cycle and arrived at its stop position the table shall have completed its cycle and shall have been stopped by a table dog, and that the carrier, upon starting another cycle shall start the table by the means of a carrier dog operating on clutch member 72 in the desired direction. By so doing it is insured that the table and carrier will never be more than a trifle out of time with one another.

It is apparent that the mechanism described may be used to control a great variety of table movements, operating either in continuous machine cycles or through a given cycle to a stop, to be started on a new cycle by the operator. In any table cycle the carrier may control all clutch shifts, except that it is preferable as mentioned above, at least once per table cycle, to bring the table to a stop by the means of a table dog and to start it again by the means of a carrier dog. This may be conveniently done at either or at both ends of the table movement, as desired. At any desired intermediate point in either direction of table travel the table rate may be changed from feed to quick traverse or vice-versa by the means of carrier dogs.

The carrier is also used for shifting the clutch 9 and brake 39. The shaft 29, Figs. 1—2—11, is connected for movement of spool 27 as previously described and has a lever 189 fixed thereon, Figs. 2—3—12, having a pivoted shoe 190 engaging a slot in a rod 191 which operates a pivoted lever 192, Figs. 3—5—12 by the means of a pivoted shoe 193 engaging another slot in the rod. A rod 194 is moved from lever 192 by the means of a pivoted shoe 195 and moves a lever 196 by the means of a pivoted shoe 197. Lever 196 is fixed on shaft 198, near the front end of which is fixed a lever 199 connected for opposite movement of different trip elements 200—201, Figs. 12-16, by the means of rods 202—203 respectively. The trip members 200—201 stand adjacent to carrier 120 in a position for either to be operated upon by dogs precisely similar to the dog 160, previously described, whereby the one or the other trip element may be operated upon to shift clutch 9 in the one or the other direction. Since it is usually desirable to shift clutch 9 at the same time that another of the previously described shifts takes place, the dog for shifting clutch 9 may ordinarily stand on the same T bolt 161 with other dogs and is so shown, Figs. 14—15—16, but it is obvious that this is not necessary and the clutch 9 may be shifted at any time during a carrier revolution.

As previously described, the shifting of spool 27 in the one direction engages clutch 9 and starts the spindle 5, while shifting in the other direction engages brake 39 to stop the spindle. Stopping of the spindle is particularly desirable in cycles where a cutter is to be returned over a finished work piece.

It is sometimes desirable, for setting-up purposes, to prevent the detent mechanism for clutch member 69 from operating as previously described to throw the clutch member quickly to opposite engagement after being disengaged. For this purpose the following mechanism is provided: The shifter rod 91, Figs. 6–8, is notched at 204 and an axially slidable and turnable rod or plunger 205, Figs. 3–6, is provided with a projection 206 disposed eccentrically with the rod axis. Rod 205 may be manually turned to three positions by the means of a knob 207 fixed thereon, the different positions being determined by the means of a pin 208 fixed in knob 207 to enter different holes, such as hole 209, suitably spaced in the support. The form and position of projection 206 and notch 204 is such that when pin 208 is entered in the one hole 209, the projection 206 interferes with the engaging movement of clutch member 69 in the feed engaging direction, but not until after the cam points 115—116 have passed one another, whereby the clutch is prevented from engaging, but is also prevented from returning to previous engagement. When pin 208 is entered into another hole 209 the projection 206 interferes with the engaging movement of clutch member 69 in the quick traverse engaging direction in a similar manner. A third hole 209 provides a rod position central between the other two, wherein the projection 206 is inoperative and the detent for clutch member 69 operates normally to quickly engage the clutch, as previously described. The means described enables the hand lever 92 to be operated during setup of the machine to stop both the table and carrier 120 in a desired position, whereupon the operator has plenty of time to set dogs to later perform a desired automatic clutch shift at that position during operation of the machine.

It may be noted that while, for convenience the operation of the machine has been described as requiring a carrier cycle for each table cycle, it is obviously possible and sometimes desirable to cause the table to complete two or more cycles during a single cycle of the carrier. Such operation may be desirable for very short table travel or for other reasons, but in any case it is advisable at least once for each table cycle to stop the table from a table dog and start it again from a carrier dog, thus bringing the table and carrier into exact timing with one another.

What is claimed is:

1. In a machine tool having a movable support and transmission mechanism for the movement thereof and including rate change and reversing means, the combination of a carrier, a drive train therefor including a second rate change means and driven from said transmission at a point unaffected by said reversing means, a dog on said carrier, trip mechanism operable from said dog for the control of said transmission, a second dog on said carrier, and trip mechanism operable from said second dog for the control of said second rate change means.

2. In a machine tool the combination of a movable support, transmission mechanism therefor including a power source, a first rate change clutch, a reverse clutch, and said support in the order recited, a rotatable carrier, a carrier train driven from said transmission at a point between said clutches, a second rate change clutch in said train, trip mechanism for shifting said reverser clutch, a plurality of dogs respectively associated with said support and with said carrier and each adapted to operate said trip mechanism, a trip device for shifting said first rate change clutch, another dog on said carrier and adapted to operate said trip device, a shifter for said second rate change clutch and another dog on said carrier and adapted to operate said shifter.

3. In a machine tool having a plurality of movable supports, the combination of transmission mechanism connectible for actuating one of said supports through a cycle of reciprocatory movement and for simultaneously actuating the other of said supports through a cycle of rotary movement, said transmission including a first clutch mechanism shiftable for simultaneously altering the rate of movement of both said supports and a second clutch mechanism shiftable for altering the relative rate of movement therebetween, a plurality of shifters respectively for the different clutch mechanisms, and a plurality of dogs each movable in accordance with said rotary cycle and respectively operable on the different shifters.

4. In a machine tool the combination of a plurality of movable supports each movable in cycles, transmission mechanism for actuating each of said supports through a cycle of movement having a predetermined time period, said mechanism including a first shiftable clutch means for altering the length of the cycle of movement of one only of said supports and also including a second shiftable clutch means for altering the relative time of said cycles, a plurality of shifters respectively for different of said clutch means, and a plurality of dogs each movable in accordance with the movement of one of said supports and respectively operative on different of said shifters.

5. In a machine tool the combination of a reciprocatory support, a transmission therefor including a plurality of devices respectively shiftable for controlling the rate and direction of said support, a carrier, a train connected with said carrier and driven from said rate controlling device exclusive of said direction controlling device, said train including a device shiftable for a change of carrier rate, individual shifters respectively for different of said devices and individual dogs on said carrier respectively on different of said shifters.

6. In a milling machine the combination of a reciprocable table, a transmission therefor including a power source, a shiftable rate change clutch, a shiftable reversing clutch and said support in the order recited, a rotary carrier, a train therefor and connected with said transmission at a point between said clutches, a shiftable speed change clutch in said train, shifters for said clutches and respectively individual to the different clutches, a dog on said carrier adapted to operate the shifter of said reverser clutch to start said table, a dog on said carrier and adapted subsequently to operate the shifter of said rate change clutch, a dog on said table and adapted to operate the shifter of said reverser clutch to stop said table subsequent to the action of previously mentioned dogs, a dog on said carrier adapted later to operate the shifter of said speed change clutch to increase the speed of said carrier, and a dog on said carrier adapted to still later operate the shifter of said speed change clutch to reduce the speed of said carrier, all of said dogs being operative during a single carrier revolution.

7. A machine as specified in claim 6 including an interlock associated with the shifter of said speed change clutch, said interlock being adjustable into and out of a position preventing said speed change clutch from shifting into said speed reducing position.

8. In a machine tool the combination of a reciprocatory support, transmission mechanism therefor including shiftable clutches, a control mechanism for shifting said clutches including a rotary carrier, a power train individual to said carrier including a shiftable rate change clutch, a shifter for said rate change clutch, and a plurality of dogs on said carrier and respectively operative to move said shifter in opposite direction.

9. A machine tool as specified in claim 8 including an interlock movable into a position preventing a portion of the movement of said shifter in one of said directions, whereby to cause said rate change clutch to occupy an intermediate position interrupting the movement of said carrier.

10. In a machine tool having a movable support and transmission mechanism therefor including a plurality of shiftable clutches, the combination of shifters respectively for the different clutches, each of said shifters having a portion adjacent said support, said portions when said shifters are in certain relative positions being approximately aligned in the same plane, a plurality of dogs, means for attaching said dogs to move with said support including a single element adjustably fixed on said support and adapted to simultaneously receive both of said dogs and to fix the position of the respective dogs to contact different of said shifter portions substantially simultaneously during the movement of said support.

11. In a machine tool the combination of transmission mechanism including a variety of shiftable clutch elements, a variety of shifters respectively for different of said clutch elements, each of said shifters having a movable portion, said portions being all movable into substantial alignment with one another, a variety of dogs respectively for the different shifters, a movable dog support, an element adjustably fixed on said support and adapted to simultaneously receive all of said dogs and to fix the positions thereof for the respective dogs to contact different of said shifter portions substantially simultaneously during the movement of said support.

12. In a machine tool the combination of a reciprocable support, a transmission therefor including a shiftable reverser clutch and a shiftable rate change clutch, each of said clutches having different engaged positions and also an intermediate disengaged position, shifters respectively for the different clutches, detent mechanism associated with the shifter of said reverser clutch and adapted to yieldingly retain said reverser clutch in either of said positions thereof, detent mechanism associated with the shifter of said rate change clutch and normally adapted to quickly shift the rate change clutch through said intermediate position thereof, and means associated with the last mentioned detent mechanism and adjustable to prevent said action thereof whereby to retain said rate change clutch in said intermediate position.

13. In a machine tool the combination of a reciprocable support, transmission mechanism therefor including a power source, a rate change clutch shiftable to fast and slow positions and to an intermediate disengaged position, a shiftable motion interrupting clutch and said support in the order recited, control mechanism for said clutches including a dog carrier, a train connected with said carrier and connected with said transmission at a point between said clutches, shifters respectively for the different clutches, detent mechanism associated with the shifter of said rate change clutch and normally adapted to automatically shift said rate change clutch through said intermediate position thereof, and manually operable means adapted to be interposed to prevent said normal action of said detent mechanism.

14. In a machine tool the combination of a rotatable tool spindle, a movable work support, a spindle train including a power source, a shiftable main clutch and said spindle in the order recited, a table train connected with said spindle train between said main clutch and spindle and including a shiftable reverser clutch, a carrier connected to be driven from said table train at a point unaffected by said reverser clutch, a plurality of shifters respectively for different of said clutches, and a plurality of dogs on said carrier respectively adapted during carrier movement to contact and move different of said shifters.

15. In a machine tool the combination of a rotatable tool spindle, a spindle transmission including a power source, a shiftable spindle clutch and said spindle in the order recited, a plurality of power elements respectively connected to be driven from said transmission at a point between said source and clutch and between said clutch and spindle, a shiftable clutch member alternatively connectible with the one or the other of said elements, a carrier connected to be driven from said clutch member, shifters respectively for said spindle clutch and clutch member, and dogs on said carrier respectively adapted to move different of said shifters during carrier movement.

16. In a milling machine, the combination of a base, a tool spindle rotatably supported from said base, a table reciprocably supported from said base for movement in a path transverse to the axis of said spindle, a spindle train including a first shiftable device, a table transmission including a feed rate train, a quick traverse rate train, a second device alternatively shiftable to be driven from one or the other of the last mentioned trains and a third device shiftable to interrupt movement of said table, a carrier, a train for movement of said carrier and connected to be driven through said second device exclusive of said third device whereby said carrier is movable when movement of said table is interrupted, a shiftable trip mechanism for shifting said first device and a dog movable with said carrier for shifting said trip mechanism.

In witness whereof we have affixed our signatures.

JOSEPH B. ARMITAGE.
EDWARD J. KEARNEY.